United States Patent [19]

Anderson

[11] Patent Number: 4,521,679

[45] Date of Patent: Jun. 4, 1985

[54] DATA INPUT MODULE

[75] Inventor: Eric G. Anderson, Rochester, Mich.

[73] Assignee: Rockwell International Corporation, Pittsburgh, Pa.

[21] Appl. No.: 496,041

[22] Filed: May 19, 1983

[51] Int. Cl.³ ............................................. G06K 19/06
[52] U.S. Cl. ..................................... 235/492; 235/380
[58] Field of Search ................................. 235/492, 380

[56] References Cited

U.S. PATENT DOCUMENTS

| | | | |
|---|---|---|---|
| 3,122,996 | 3/1964 | Heatwole | 235/492 X |
| 3,928,750 | 12/1975 | Wolflingseder | 235/492 X |
| 3,934,122 | 1/1976 | Riccitelli | 235/492 X |

*Primary Examiner*—David L. Trafton

[57] ABSTRACT

A data input module has a data card jack with power-out contacts, power-in contacts and data input contacts. The power-out contacts are connected to a power source, which is protected against surges and alternating voltages in the module. The power-in contacts are connected to power terminals of three integrated circuits and a fourth oscillator integrated circuit, which feeds clocking pulses to the three integrated circuits. The data contacts of the jack are connected to input terminals of two of the integrated circuits. The power-in contacts are additionally connected to inputs of the third integrated circuit. Power from the power source powers the input module elements through the power-out and power-in contacts and through a card interposed between the contacts to activate the circuit. At the same time, binary data from the signal contacts provides information to the first and second integrated circuits. The integrated circuits are pulsed to provide pulse sequences from the first integrated circuit to the second integrated circuit, from the second integrated circuit to the third integrated circuit and pulsed signal sequences from the third integrated circuit, which summarizes the simultaneous plural binary inputs from the jack into a pulsed output signal.

7 Claims, 2 Drawing Figures

DATA INPUT MODULE

BACKGROUND OF THE INVENTION

This invention relates to data reading circuits and particularly circuits which convert simultaneous binary data from plural parallel lines into a sequence of pulses on an output line. The invention is particularly related to key card reading data input modules.

Existing modules are either complex or are incapable of converting a large number of simultaneous input signals into a pulsed signal train or require separate power sources for the signals and for the reading.

SUMMARY OF THE INVENTION

The present invention provides a noncomplex data input module in which simultaneous binary data from plural input lines is assembled into an output sequence of pulses on a single line.

The invention overcomes problems of the prior art by providing power from the module to a card reader so that the power is supplied through the card, back into the module to operate integrated circuits within the module and so that the power is applied to coded conductors within the card to give shorted or open signals to inputs of the integrated circuits. Power from the card and the jack is supplied to the integrated circuits and to an oscillator integrated circuit to provide clock pulses.

A preferred data input module has a power source and a data input jack having plural terminals for simultaneously reading binary information from multiple contacts on a card. The jack has power-out contacts connected to the power source for providing power to power-in contacts on a card. The jack further has power-in contacts for receiving power from power-out contacts of a card. The input module apparatus further includes plural integrated circuits and plural conductors severally connecting each contact in the jack to individual contacts of the integrated circuits for providing binary data from the jacks to individual inputs of the integrated circuits. Clock means is connected to the integrated circuits for providing clocking pulses to the integrated circuits. A line connects the power-in contacts in the jack to each of the integrated circuits and the clock for powering the integrated circuits in the clock by power from the power source passed into and out of a key card by the power-out contacts and the power-in contacts in the jack. Lines serially connect the integrated circuits and take a signal from a last integrated circuit in the series.

Preferably the power source further has excess voltage grounding means and alternating voltage removing means for preventing excess voltage and alternating voltages from reaching the power-out contact and from reading the signal contacts and the power-in contacts. Limiting means are connected to the signal output line for limiting voltage and current on the signal conductor. A secondary voltage means is connected to the power-in means and to the integrated circuits for controlling voltage in the integrated circuits. Limiting means are connected to ground and severally are connected to the conductors between the jack contacts and the integrated circuits for limiting input to the integrated circuits from the jack contacts.

Preferably, the plural integrated circuits include three integrated circuits. First and second integrated circuits have inputs connected to the jack. The third integrated circuit has inputs connected to the power-in contact of the jack. The first integrated circuit has a pulsed signal output connected to the second integrated circuit, and the second integrated circuit has a pulsed signal output connected to the third integrated circuit. The third integrated circuit has a pulsed signal output connected to the output signal line for producing sequential output pulses on the signal line according to binary data inputs on the data contacts in the jack.

DETAILED DESCRIPTION OF THE DRAWINGS

The data input module of the present invention accepts a key card with a code. The data input module accepts the code from the key card and transmits the code as a 16-bit data stream to the host apparatus, which may be, for example, a Rockwell Tripmaster trip recorder. The input card has edge contacts that plug into the data input module. Shorted conductors to the edge contacts are interrupted to provide a code that is read by the data input module. A method is used to measure the strobe times of each bit with a 4-bit wide sync pulse that has its width measured by the host device, for example, the Rockwell Tripmaster trip recorder. The width is used to determine what the width will be of each of the 16 serial bits that are transmitted to the host. The sync pulse is therefore used as a "rubber yardstick".

Figure 1:
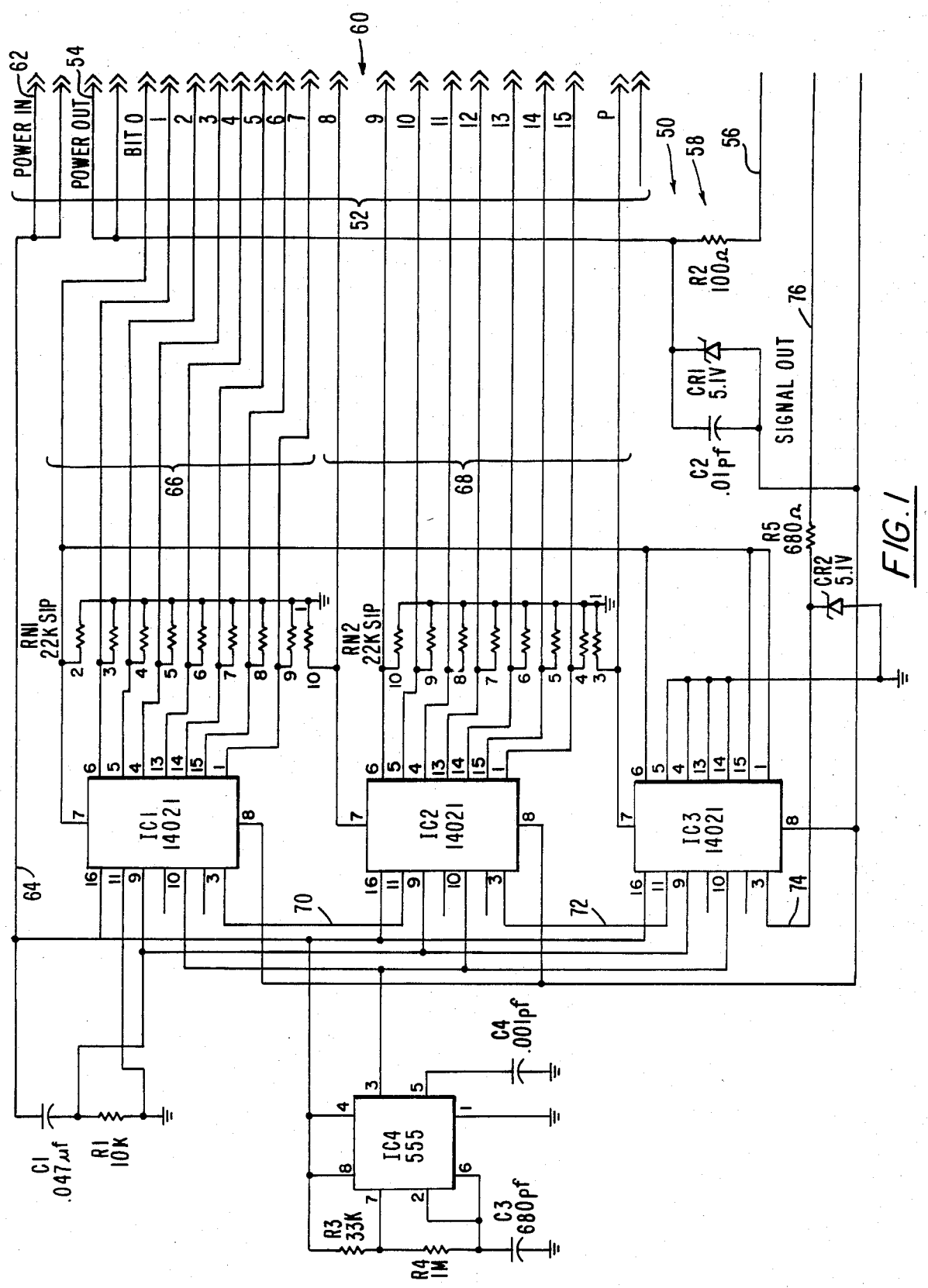
FIG. 1 is a schematic diagram of the preferred data input module.

Referring to FIG. 1, a data input module is generally indicated by the numeral 50. The input module has a data input jack 52 with power-out contacts 54 which are connected to a source of power 56.

Power source 56 has protective devices 58, which include a current limiting resistor R-2, an alternating voltage grounding capacitor C-2 and an excess voltage grounding breakdown diode CR-1.

Jack 52 includes plural parallel signal contacts 60.

Power from source 56 through power-out contacts 54 is supplied to key card circuits. The power is transmitted through the key card circuits and back to data contacts 60 which are read to determine whether the key card circuits are shorted or open. Power-in contacts 62 receive power from power source 56 via power-out contacts 54, key card contacts and power-in contacts 62 to supply power to power line 64. The power line 64 supplies power to terminals 16 of integrated circuits IC-1, IC-2, and IC-3 and to terminals 4 and 8 of integrated circuit IC-4. Power is also supplied from line 64 to terminals 1, 6 and 15 of integrated circuit IC-3 and the capacitor C-1 which maintains voltage cross inputs 9 and 16 of integrated circuits IC-1, IC-2 and IC-3.

Resistor R-1 provides a voltage differential between grounded terminal 11 and terminal 9 in IC-1.

Terminals 8 in IC-1, 2 and 3 are grounded, as are terminals 4, 5, 13 and 14 of IC-3.

Plural signal conductors 66 and 68 are connected between jack 52 and the integrated circuits IC-1 and 2. Resitors RN-1 and RN-2 connect those conductors to ground.

Integrated circuit IC-4 with resistors R-3 and R-4 and capacitors C-3 and C-4 provides keying pulses in terminals 10 of integrated circuits IC-1, IC-2, and IC-3.

Integrated circuit IC-1 delivers a pulse train on line 70 to integrated circuit IC-2. The latter delivers a combined pulse train on line 72 to integrated circuit IC-3 and integrated circuit IC-3 produces the integrated pulse train as an output signal on line 74.

Resistor R-5 limits current on signal output line 76, and breakdown diode CR-2 cancels voltage surges.

The output signal on line 76 is used for identification in a separate device.

Figure 2:
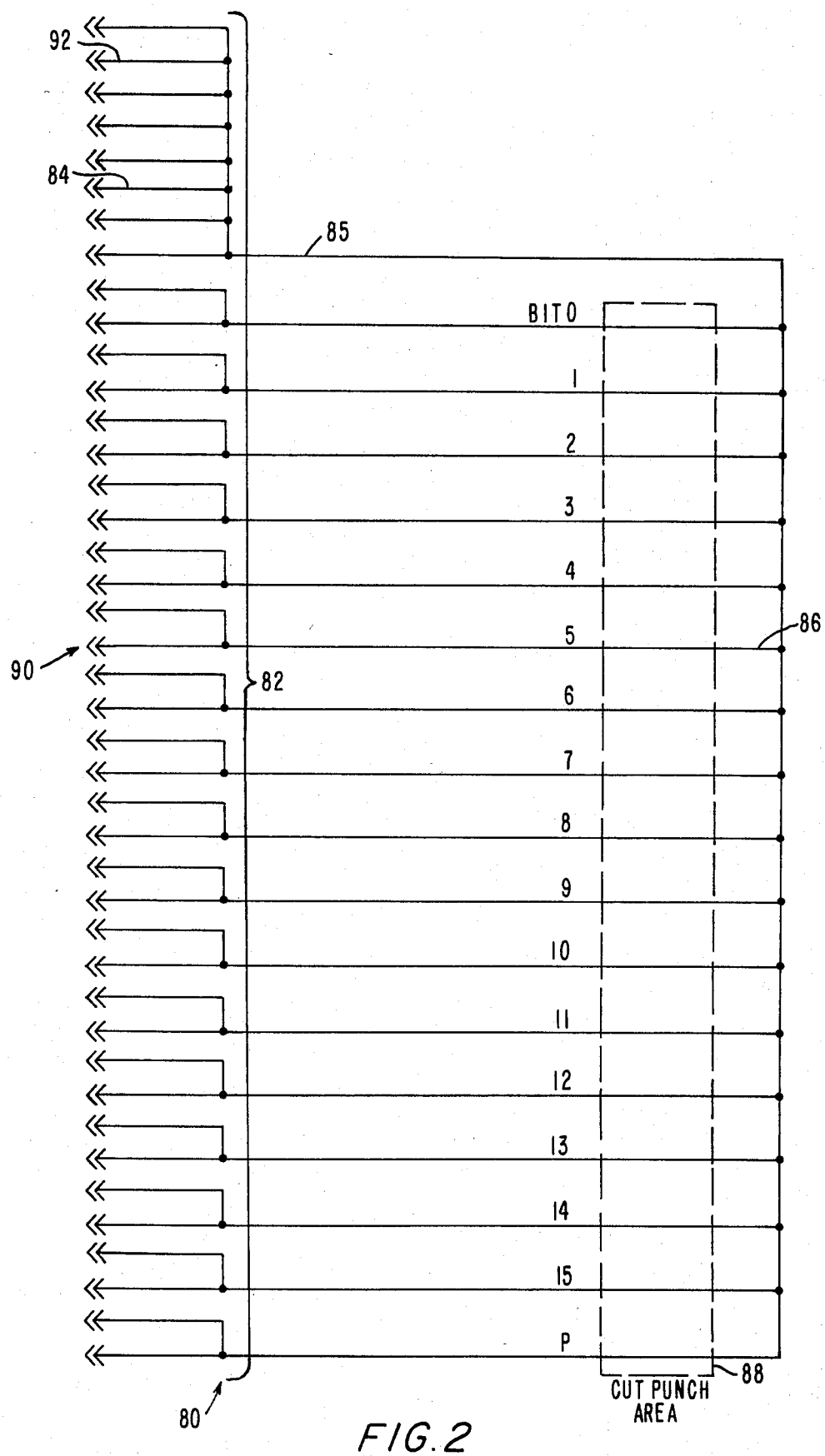
FIG. 2 is a schematic diagram of a key card used with the schematic module.

As shown in FIG. 2, a key card for using with module 50 is generally indicated by the numeral 80. The key card has contacts 82 which cooperate with contacts 52 in the module. Power-in contacts 84 on key card 80 receive power from power-out contacts 54 on the module 50. The DC power is supplied from the input contacts 84 to line 85 in which, in turn, supplies the voltage to parallel lines 86. Lines 86 are selectively interrupted by punching in the area 88 to provide binary information, either shorted or open, on data contacts 90 which connect to contacts 60 in jack 52.

Power-out contacts 92 connect to power-in contact 62 in jack 50 to provide a power flow from the source through the card to operate the integrated circuits in the data module.

While the invention has been described with reference to a specific embodiment, modifications and variations of the invention may be constructed without departing from the scope of the invention.

I claim:

1. A data input module comprising a power source, a data input jack having plural terminals for simultaneously reading binary information from multiple contacts on a card, the jack having power-out contacts connected to the power source for providing power to power-in contacts on a card, and the jack further having power-in contacts for receiving power from power-out contacts of a card, the input module apparatus further comprising plural integrated circuits and plural conductors severally connecting each contact in the jack to individual contacts of the integrated circuits for providing binary data from the jacks to individual inputs of the integrated circuits, clock means connected to the integrated circuits for providing clocking pulses to the integrated circuits, and means for connecting the power-in contacts in the jack to each of the integrated circuits and the clock means for powering the integrated circuits and the clock means by power from the power source passed into and out of a key card by the power-out contacts and the power-in contacts in the jack, means for serially connecting the integrated circuits, and means for taking a signal from a last integrated circuit in the series.

2. The apparatus of claim 1 wherein the power source further comprises excess voltage grounding means and alternating voltage removing means for preventing excess voltage and alternating voltages from reaching the power-out contact and, hence, from reaching the signal contacts and power-in contacts.

3. The apparatus of claim 1 further comprising signal output limiting means connected to the signal output means for limiting the signal output.

4. The apparatus of claim 1 further comprising secondary voltage means connected to the power-in means and the integrated circuits for controlling voltage level of the integrated circuits.

5. The apparatus of claim 1 further comprising ground means connected to the integrated circuit means and to the clock means.

6. The apparatus of claim 1 further comprising limiting means connected to ground and severally connected to the conductors between the jack contacts and the integrated circuits for limiting input to the integrated circuits from the jack contacts.

7. The apparatus of claim 1 wherein the plural integrated circuits comprise three integrated circuits, first and second integrated circuits having inputs connected to the jack, and the third integrated circuit having inputs connected to the power-in contact of the jack and having inputs connected to ground, the first integrated circuits having a pulsed signal output connected to the second integrated circuit and the second integrated circuit having a pulsed signal output connected to the third integrated circuit and the third integrated circuit having a pulsed signal output connected to the output signal means for producing sequential output pulses on the signal means according to binary data inputs on the data contacts in the jack.

* * * * *